United States Patent
Heath (10) Patent No.: US 8,847,785 B2
(45) Date of Patent: Sep. 30, 2014

(54) METHOD AND APPARATUS FOR REDUCING BATTERY PASSIVATION IN A METER-READING MODULE

(75) Inventor: Nicholas Heath, Apex, NC (US)

(73) Assignee: Sensus USA Inc., Raleigh, NC (US)

(*) Notice: Subject to any disclaimer, the term of this patent is extended or adjusted under 35 U.S.C. 154(b) by 646 days.

(21) Appl. No.: 13/101,203

(22) Filed: May 5, 2011

(65) Prior Publication Data

US 2012/0280830 A1 Nov. 8, 2012

(51) Int. Cl.
*H01M 10/42* (2006.01)
*H01M 10/44* (2006.01)
*H01M 10/48* (2006.01)
H01M 10/052 (2010.01)
G01D 4/00 (2006.01)
H01M 6/50 (2006.01)

(52) U.S. Cl.
CPC .......... *H01M 10/425* (2013.01); *H01M 10/443* (2013.01); *H01M 10/052* (2013.01); *Y04S 20/32* (2013.01); *Y02E 60/12* (2013.01); *G01D 4/002* (2013.01); *H01M 6/5088* (2013.01); *Y02B 90/241* (2013.01); *H01M 2010/4271* (2013.01); *H01M 6/50* (2013.01); *Y02B 90/244* (2013.01); *H01M 10/486* (2013.01); *H01M 10/44* (2013.01); *H01M 10/42* (2013.01); *Y04S 20/327* (2013.01); *H01M 10/4257* (2013.01); *H01M 6/5044* (2013.01); *H01M 10/48* (2013.01)
USPC ................. 340/870.02; 340/636.19; 320/100; 320/129; 320/130; 320/131

(58) Field of Classification Search
CPC .. Y02E 60/12; H01M 10/42; H01M 10/4257; H01M 10/486; H01M 6/5044
USPC ........ 340/636, 870.02, 636.19; 320/100, 129, 320/130, 131
See application file for complete search history.

(56) References Cited

U.S. PATENT DOCUMENTS 5,438,329 A 8/1995 Gastouniotis
5,677,612 A * 10/1997 Campagnuolo et al. ...... 320/141

(Continued)

FOREIGN PATENT DOCUMENTS

GB 2292249 A * 2/1996
JP 2989076 B2 12/1999

(Continued)

OTHER PUBLICATIONS

"Battery Depassivation Algorithm," IP.com Prior Art Database Technical Disclosure, IPCOM000144103D, Dec. 18, 2006, United States.

Primary Examiner — Daniel Wu
Assistant Examiner — Benyam Haile
(74) Attorney, Agent, or Firm — Murphy, Bilak & Homiller, PLLC (57) ABSTRACT

The teachings herein disclose a method and apparatus for preventing excessive battery passivation in an electronic meter-reading module. The module operates in a low-power state most of the time. The low-power state is interrupted at defined transmit times, wherein the module temporarily turns on or otherwise activates an included communication transmitter, for the transmission of data to a remote node reachable through a wireless communication network. Because of its low current draw during the times between data transmissions, the module's battery is vulnerable to passivation layer buildup. Advantageously, however, the module is configured to perform dummy activations of its transmitter at times other than the defined transmit times, e.g., in the intervals between data transmissions. These dummy activations are not for data transmission, but rather are temporary activations of the relatively high-power transmitter, for reducing passivation layer buildup on the battery in advance of a next data transmission.

20 Claims, 3 Drawing Sheets

(56) References Cited

U.S. PATENT DOCUMENTS

| | | | |
|---|---|---|---|
| 5,900,808 A | 5/1999 | Lebo | |
| 6,118,251 A | 9/2000 | Atwater | |
| 2006/0052985 A1* | 3/2006 | Ito et al. | 702/188 |
| 2007/0079701 A1 | 4/2007 | Sayers et al. | |
| 2009/0248100 A1 | 10/2009 | Vaisnys et al. | |
| 2012/0126753 A1* | 5/2012 | Carkner | 320/129 |

FOREIGN PATENT DOCUMENTS

| | | |
|---|---|---|
| WO | 9808265 A1 | 2/1998 |
| WO | WO 9808265 A1 * | 2/1998 |

* cited by examiner

METHOD AND APPARATUS FOR REDUCING BATTERY PASSIVATION IN A METER-READING MODULE

BACKGROUND

The present invention relates generally to depassivating a battery in an electronic device and, more particularly, to depassivating a battery using functional hardware already present in the device at times when the functional hardware is not performing a normal operation.

Batteries are used as a power source for a variety of different functional devices. Many batteries, such as lithium batteries, have a long shelf life and are able to power a functional device for an extended period of time. The life of the batteries may be further extended when the device has a standby mode that draws very little current from the battery when the device is not performing functional operations, or is otherwise operating in a low-current state.

One aspect of lithium and certain other types of batteries is the formation of a passivation layer that forms through a reaction between the metal anode and cathode. The passivation layer is a resistance layer that builds up over time that prevents or reduces internal discharge of the battery thus allowing for a longer shelf life. The passivation layer may also build up faster when the battery is exposed to a high environmental temperature. A disadvantage of the passivation layer is that the battery exhibits a drop in initial available voltage when the battery is first used after a standby period. The initial available voltage may not be adequate to properly power the device causing the device to shut down or abort specific normal operations performed by the device.

SUMMARY

The teachings herein disclose a method and apparatus for preventing excessive battery passivation in an electronic meter-reading module. The module operates in a low-power state most of the time. The low-power state is interrupted at defined transmit times, wherein the module temporarily turns on or otherwise activates an included communication transmitter, for the transmission of data to a remote node reachable through a wireless communication network. Because of its low current draw during the times between data transmissions, the module's battery is vulnerable to passivation layer buildup. Advantageously, however, the module is configured to perform dummy activations of its transmitter at times other than the defined transmit times, e.g., in the intervals between data transmissions. These dummy activations are not for data transmission, but rather are temporary activations of the relatively high-power transmitter, for reducing passivation layer buildup on the battery in advance of a next data transmission.

One example embodiment provides a method of preventing excessive battery passivation in an electronic meter-reading module that is powered from a battery. The method includes collecting metering data from an associated meter on an ongoing basis using comparatively low-power circuitry that is powered from the battery, and transmitting the metering data to a remote node through a wireless communication network at defined transmit times using a relatively high-power communication transceiver that is also powered by the battery and activated temporarily during the transmit times. Advantageously, the method further includes performing dummy activations of the communication transceiver at additional times other than the defined transmit times, not for transmitting metering data but rather for depassivating the battery.

In another embodiment, a method of preventing excessive battery passivation in an electronic meter-reading module includes operating in a low-power state for extended periods of time, and collecting or otherwise maintaining metering data for an associated meter while in the low-power state. The method further includes interrupting the low-power state at defined transmit times, by activating a communication transceiver, including a transmitter, for performing a data transmission, and interrupting the low-power state at additional times other than said defined transmit times, by activating the transmitter not for data transmission, but rather to reduce passivation layer buildup in the battery.

In yet another embodiment, an electronic meter-reading module is configured for battery-powered operation from a battery, and includes a controller and a wireless communication transceiver. The controller is configured to obtain metering data from an interface circuit associated with a meter, and the communication transceiver is configured to communicatively couple the module to a remote node reachable through a wireless communication network. Further, the controller is configured to: turn on or otherwise activate the communication transceiver temporarily at defined transmit times, for transmission of said metering data or other information; and perform dummy activations of a transmitter in the communication transceiver at additional times other than said defined transmit times, for depassivating the battery.

Of course, the present invention is not limited to the above brief summary of advantages and features. Those skilled in the art will recognize additional features and advantages from the following detailed discussion, and from the accompanying illustrations. Further, the various aspects of the various embodiments may be used alone or in any combination, as desired.

DETAILED DESCRIPTION

The present application is directed to a method and apparatus for preventing excessive battery passivation in a battery-powered device, such as an electronic meter-reading module ("module") that is powered from a battery. By way of non-limiting example, such modules each include a functional circuit powered by a battery that collects metering data from an associated meter on an ongoing basis. Here, "ongoing" basis does not necessarily mean continuous reading, but rather connotes that the module tracks or otherwise records metering data over time. For example, the module may track pulse counts or read other usage-related data from the associated meter.

The example module also includes a transceiver powered by the module's battery. In a non-limiting example, the transceiver is off or otherwise inactive most of the time, to save power. At defined transmit times, which may be scheduled and/or event driven, the module turns on at least the transmit portion of its communication transceiver and transmits metering data or other information to a remote node that is reachable through a wireless communication network.

Generally, the module also activates the receiver portion of its transceiver, coincident with transmitter activation, for two-way communications, such as for receiving acknowledgements of its transmissions, etc. The module also may activate just the receiver portion at other times, to listen for messages targeted to the module, and it will be understood that the receiver portion of the transceiver may operate at substantially lower power than the transmitter.

An example transceiver comprises a radiofrequency transceiver configured to operate on defined uplink and downlink frequencies, such as within the 900 MHz spectrum and may include digital modulator and demodulator circuits. Further, in one or more embodiments, the transceiver includes a transmitter, e.g., with a power amplifier (PA), which is configured to operate at a defined transmit power. Example transmit powers include 0.5 Watts, 1 Watt, and 2 Watts. In at least one embodiment, the included transmitter is programmable with respect to its transmit power, meaning that the module can select or otherwise control the transmit power. In one example of such operation, the module may use the lowest defined power setting that provides for acceptably reliable data transmission.

In a broad example of the battery passivation reduction method contemplated in this disclosure, the module exploits the power draw of its included communication transceiver, for reducing passivation layer buildup in the included battery. That is, in addition to using the transceiver for "normal" communications in accordance with the defined, functional operation of the module, the module activates its transceiver at certain times, not for actual communications, but rather to draw higher current from its battery and thereby reduce any passivation layer that might have built up during an extended period of low-current operation.

Consider an example case, where the module collects metering data on an ongoing basis, while operating in a low-power state. In an example case, the module may draw 50 micro amps during times when communications are not active. Then, at certain defined transmit times, the module temporarily activates its communication transceiver, to send metering data and/or other information. When the transceiver is active, the module may draw 500 milliamps or more. (Here, "defined transmit times" broadly connotes periodic or other scheduled transmissions, as well as event-driven transmissions, such as where the module is configured to automatically transmit data responsive to detecting alarm conditions, etc., or when the module is polled or otherwise requested to send data.)

Consequently, the example module can be understood as operating at very low current draws for potentially extended periods of times, with intermittent, temporary operation at much higher currents during data transmissions. Such operation allows potentially excessive passivation layer buildup on the module's battery, which can interfere with the module's ability to operate correctly when it activates its transceiver for transmission of metering data. Thus, according to one or more embodiments herein, the module is configured to temporarily activate its transceiver between actual data transmissions, not for data transmission, but rather to "hit" the battery with a higher-current load that reduces any passivation buildup that would otherwise occur between data transmissions.

These activations may be referred to as "dummy" activations, because they are not real data transmissions, but rather transceiver activations undertaken specifically to condition the battery between real data transmissions. Moreover, in one or more embodiments, the module intelligently manages such dummy transmissions.

In one example embodiment, the module does not perform a dummy activation of its transceiver unless the interval between data transmissions exceeds a defined threshold, which may be understood as an elapsed time qualifier. Additionally, or alternatively, the module performs dummy activations only if the ambient temperature exceeds a defined threshold, which can be advantageous as battery passivation problems tend to be more severe at higher ambient temperatures. Note that such ambient-temperature based decision processing may be qualified to use "time-at-temperature" values, where the module performs dummy activations only if the module is "soaking" at higher temperatures.

The module may implement such dummy activations in a "dummy activation routine" that is triggered conditionally as noted above, based on elapsed time, temperature, battery voltage behavior, etc. In one embodiment, the dummy activation routine includes only one dummy activation—i.e., a temporary, "pulsed" turn-on of the included communication transmitter. The length of this pulse may be fixed or adapted, e.g., as a function of temperature or observed battery voltage behavior. In another embodiment, however, the dummy activation routine is iterative, meaning that one execution of the routine may entail more than one dummy activation.

For example, in one execution of the routine, the module may perform an initial turn-on of the communication transceiver and then decide whether to perform one or more additional turn-ons based on observing how the battery voltage behaved in association with the initial turn-on. Further, the module may adapt the on-time pulse width and/or the transmitter power setting, for the initial turn-on and/or any of the subsequent turn-ons within one run of the battery depassivation routine. In an advantageous example of this approach, the module minimizes the battery life expended by the depassivation routine by performing an initial pulse and observing the battery voltage behavior. If the voltage is well behaved, e.g., does not droop below a defined operating or test voltage threshold, the module terminates this run of the battery depassivation routine. On the other hand, if the battery voltage is not well behaved, the module continues the battery passivation routine by performing one or more additional pulses.

For example, at some point within a given interval of low-power operation, the module draws a current pulse from the battery by activating the transceiver for a few hundred milliseconds, while observing the battery voltage. If the battery voltage falls below some programmed threshold, the module performs one or more additional pulses, possibly of varying duration and current magnitude, to further condition the battery for the next actual data transmission. Such iteration may be ended upon observing acceptable battery voltage behavior, or upon hitting a programmed repetition limit.

Figure 1:
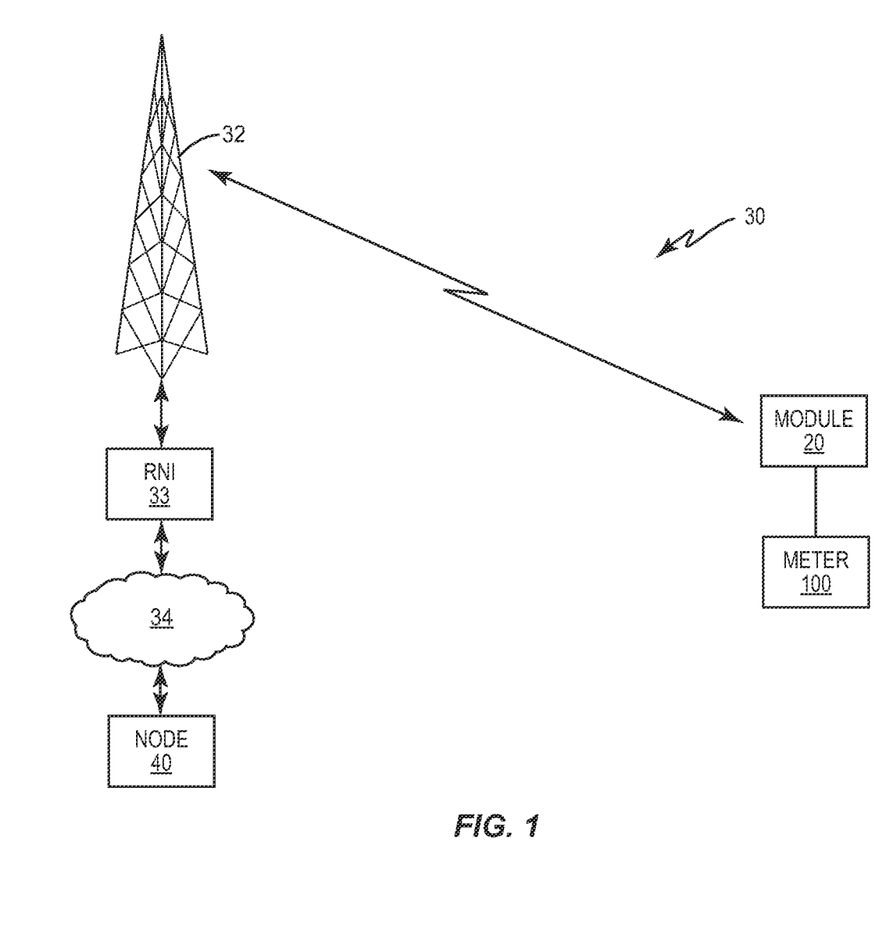
FIG. 1 is a block diagram of one embodiment of a battery-powered, meter-reading module communicatively coupled to a remote node through a wireless communication network.

With the above in mind, FIG. 1 illustrates a non-limiting example embodiment of an electronic meter-reading module. In particular, FIG. 1 depicts a module 20 that is positioned in the field and associated with a meter 100. The module 20 is configured for low average current draw and long battery life, e.g., twenty years. As such, the module 20 will be understood as operating in a low-power state the majority of the time, interrupted by brief instants of higher-power operation, during which the module 20 conducts communication operations.

The module 20 receives inputs, e.g., metering pulses or other metering signals, from the meter 100. In one or more embodiments, the module 20 is configured to monitor and record (e.g., count or otherwise store) metering signals such as pulses corresponding to meter revolutions, for accumulation of the metering data over time. Such operation is done at low power, e.g., at current draws at or below 100 micro amps. The module's battery is therefore prone to passivation layer buildup during this low-power operating state. In a similar but alternative embodiment, the module 20 sleeps most of the time, but wakes up periodically to "read" the associated meter 100, which may have dial or wheel positions that can be sensed by the module 20 and interpreted as usage data.

In any case, the module 20 is further configured to transmit collected metering data at defined transmit times, through a wireless communication system 30 to a remote node 40 for receipt by an associated user. The remote node 40 is, by way of non-limiting example, a computer server operated by a utility company and it may be integrated into or communicatively coupled with operations and maintenance systems, billing systems, etc. In this regard, it will be understood that in one or more embodiments the module 20 may also receive signals from the remote node 40 through the communication network 30 to adjust various settings or otherwise change the configuration of the module 20, or to control it, such as for demand control.

The communication network 30 provides two-way radio links 31—e.g., an uplink and a downlink—to the module 20. The depiction of the communication network 30 is simplified for ease of illustration and, as such, is shown with one base station 32. It will be appreciated that as a matter of practical implementation the communication network 30 may include multiple base stations 32 dispersed over one or more geographic regions, and that these multiple base stations 32 may be configured in a cellular fashion, as is known. According to the cellular configuration, each base station 32 serves a defined geographic region (cell), where those cells may be configured in an overlapping or adjacent fashion to provide more or less contiguous coverage over a larger area.

As an example, the communication network 30 comprises a FLEXNET radio network from SENSUS USA, Inc. FLEXNET radio networks operate in licensed spectrum in the 900 MHz range, with the uplink utilizing 901 to 902 MHz and the downlink utilizing 940 to 941 MHz. These spectrum allocations are subdivided into multiple narrowband channels, e.g., 25 KHz channels, for supporting potentially large pluralities of modules 20. Individual ones of the narrowband channels can be allocated to respective modules 20, or a set of modules 20 can be assigned to operate on one or more such channels, while other groups are assigned to other channels. Data is sent on a per-channel basis using Frequency Shift Keying ("FSK"), e.g., 4, 8, or 16FSK, where the data may be "packaged" in messages of a predefined bit length.

The information transmitted from each such module 20 is transmitted through the communication network 30 and conveyed to a radio network interface ("RNI") 33, also sometimes referred to as a "regional network interface." The RNI 33, which may be a server or other computer system that is configured with a radio interface, is configured to receive computer network signaling, e.g., IP-based packets, from the remote node 40 and convert such signaling into control and data signaling for transmission via the base station 32.

Conversely, the RNI 33 provides for conversion of radio network signaling incoming from individual modules 20 into computer network signaling for transfer to the node 40. In particular, such messages may be provided to the remote node 40 via an interface 34, which may be, for example, a computer network interface accessible via a computer network link, such as provided via the Internet or through a private IP network. Information regarding module configuration may likewise be sent from the remote node 40 through the interface 34 and RNI 33, to the communication network 30 for receipt by an individually targeted module 20. That is, there may be many modules 20, and communications may be addressed to or otherwise carry information identifying the particular module 20 (or modules 20) targeted by a given downlink transmission.

The illustrated module 20 may be operatively connected to a variety of different meter types. Embodiments include but are not limited to gas, electric, and water meters that supply the corresponding commodity to a household, business, township, city, etc. The module 20 communicates usage information for the meter 100 to a remote user 40, for billing, monitoring, etc.

Additionally, the module 20 may also be operatively connected to various sensors, including but not limited to a water level sensor for a reservoir and pressure sensor operatively connected to a piece of equipment. The signals from such sensors may trigger data transmission by the module 20. For example, the module 20 may initiate a data transmission to signal an alarm condition, as indicated by an attached level sensor.

The type of metering installation therefore may determine the transmission timing of the module 20. For example, in some contexts, it is enough for the module 20 to transmit metering data at predefined times, e.g., every four hours, or perhaps once a day. In other contexts, such as where the module 20 receives level sensing inputs or otherwise provides for condition monitoring, it may still transmit at predefined intervals, but it may additionally transmit on an as-needed basis, such as when exceptions are detected, either with a monitored signal or as a result of self-testing failures, etc.

All such possibilities are encompassed in the term "defined transmit times." That is, the term "defined transmit times" connotes predefined or dynamically determined transmission intervals and/or connotes as-needed, conditional transmissions. In this sense, the module 20 in one or more embodiments may be understood as operating in a generally low-power state, wherein it is sleeping or standing by (although it may be engaged in meter monitoring and data collection). This low-power state is interrupted at defined transmit times, wherein the module 20 activates its included transmitter on a temporary basis, e.g., for less than a second, during which it transmits metering data and possibly other information to the remote node 40.

As noted in the context of FIG. 1, various other modules 20 may be positioned at other locations in the field and communicate with one or more users through the communication network 30. There may be a large plurality of modules 20 associated with the remote node 40, and there may be other pluralities of modules 20 associated with additional remote nodes, such as those associated with other utility companies. The RNI 33 thus may provide communication interfacing for more than one remote node 20 and allow for communication with distinct sets of modules 20 by respective system operators.

Figure 2:
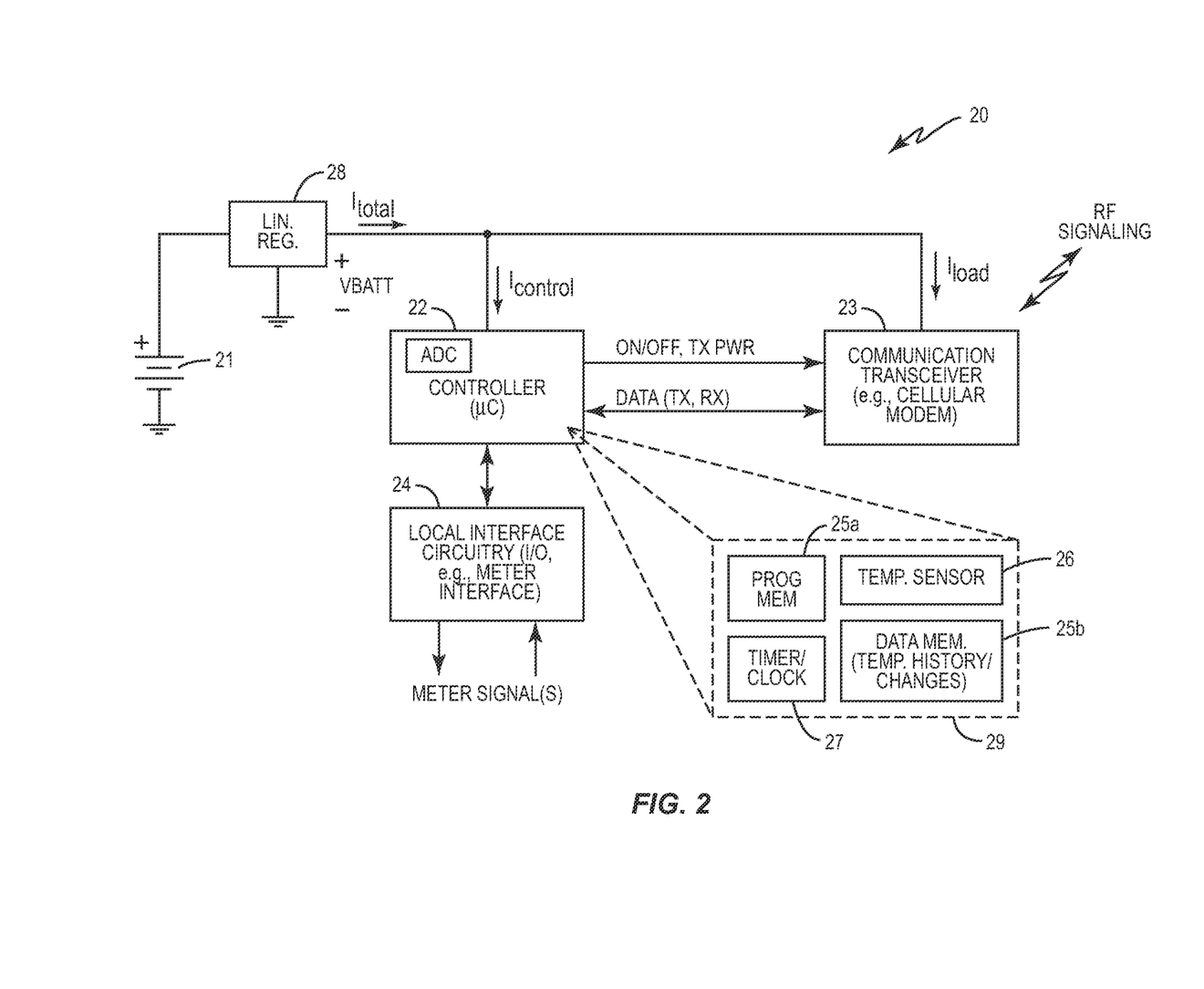
FIG. 2 is a block diagram of one embodiment of a battery-powered meter-reading module, such as shown in FIG. 1.

FIG. 2 schematically illustrates an embodiment of a module 20. This embodiment illustrates the module 20 as being a low power communication module for remote data gathering of information from a meter 100. However, it is contemplated herein that the battery conditioning method and apparatus taught herein, for reducing battery passivation layer buildup during low power operation, can be incorporated into other types of electronic devices that are similarly equipped with communication transceivers.

In any case, in the illustration the module 20 includes a battery 21 that supplies power to a controller 22 and a transceiver 23. Note that the transceiver 23 can be turned on and off, e.g., by the controller 22, or otherwise selectively operated in an inactive mode with zero or very low current draw, and an active mode with a substantially higher current draw, where the actual magnitude of the current draw of the transceiver 23 depends on, for example, the configured transmission power.

The battery 21 includes one or more electrochemical cells that convert stored chemical energy into electrical energy. The battery 21 is configured to produce current immediately without requiring charging prior to use. Examples of batteries 21 include but are not limited to lithium batteries and alkaline batteries. The battery 21 is constructed to have a long shelf life that allows for intermittent use over an extended period of time.

The module 20 may include a linear regulator 28 associated with the battery 21. The linear regulator 28 is a voltage regulator that maintains a constant output voltage to the controller 22 and the transceiver 23.

The controller 22 is powered by the battery 21 and provides the primary operating and control logic for the module 20. The controller 22 may comprise dedicated or programmable circuits, or any combination thereof. In at least one embodiment, the controller 22 comprises one or more microprocessor-based circuits, such as a low-power 8-bit microcontroller that integrates program and data memory, along with counters/timers, etc. In another embodiment, the controller 22 is implemented in an FPGA, ASIC, or other digital processing logic.

Regardless, the controller 22 includes or is associated with interface circuitry 24 for receiving and/or sending information with the metered device 100. For example, the metered device 100 may provide digital pulses or analog signal, and these may be directly input to the controller 22 via coupling through the interface circuit 24, or the interface circuit 24 may provide level shifting, signal conditioning/conversion, ESD protection, etc.

FIG. 2 illustrates additional circuit and/or functional elements 29, some of which at least may be integrated into the controller 22. For example, memory 25*a* stores information necessary for the operation of the module 20. The memory 25*a* may include functional programming for operating the module 20 including interfacing with the metered device 100 and configuring the transceiver 23 for transmitting and/or receiving information with the user at the remote node 40.

Thus, in one or more embodiments, the memory 25*a* serves as a computer-readable medium providing persistent (non-transient) storage of computer program instructions that configure the module 20 according to the teachings described herein, when such instructions are executed by the digital processing logic embodied in the controller 22. Memory 25*a* may also be able to store configuration settings, such as transmit times, etc., and data received from the metered device 100, or derived from monitoring signals from the metered device 100. Alternatively, an additional memory 25*b* provides for such storage and serves as working memory for the controller 22.

In general, the module 20 may have a combination of program and data memory, and at least a portion of such memory may provide for non-volatile storage of configuration data, metering, data, etc. Such memory may include, by way of non-limiting example, FLASH, EEPROM, SRAM, or any combination thereof. Non-volatile data storage may be provided using battery-backed SRAM, EEPROM, etc.

Additionally, a temperature sensor 26 determines the environmental (ambient) temperature of the module 20. Note that the temperature sensor 26 is shown as a functionally separate element, but it may be integrated into the controller 22 in some cases. As a non-limiting example, the temperature sensor 26 comprises a low-cost "band gap" type temperature sensor, but other known types of temperature sensors may be used as needed or desired.

The controller 22 may include an analog-to-digital converter (ADC) having one or more channels or signal inputs, allowing the controller 22 to digitize a voltage-mode or current-mode temperature signal, as provided by the temperature sensor 26. Of course, the temperature sensor 26 may provide for direct digital readout of temperature. In such cases, the controller 22 still may use its ADC capabilities for reading level sensor signals, etc. While not shown, the controller 22 also may include a PWM signal generator, a digital-to-analog converter (DAC), etc., as needed for the particular metering configuration at issue.

In any case, the controller 22 uses the temperature sensor 26 to monitor one or more temperature related parameters, including one or more of the following items: the current environmental temperature at the module 20; the amount of time the module 20 is exposed to an environmental temperature above a defined threshold; and temperature changes, such as changes in ambient temperature over one or more time periods. In one or more embodiments, the module 20 performs battery depassivation on a timed basis, independent of temperature, e.g., it performs a dummy activation of its communication transceiver 23 at some point between scheduled data transmission times, at least in cases where the interval between scheduled data transmissions exceeds a defined threshold duration of time.

That point may be biased to be just in advance of the scheduled data transmission activation, to ensure that the battery 21 is "ready" for the actual data transmission. Alternatively, the dummy activation may be timed to occur at about the midpoint of the interval, which may allow a bit more passivation layer buildup with respect to the next timed data transmission, but also offers the advantage of reducing the maximum amount of passivation layer buildup that is permitted to occur, and thereby may keep the battery 21 in generally better condition for unscheduled, event-driven transmissions that cannot necessarily be anticipated by the controller 22.

As a consequence of these timing considerations, and for basic functional considerations, one or more embodiments of the module 20 include a timer/clock 27. The timer/clock 27 may be incorporated into the controller 22, or may be standalone. Indeed, the timer/clock 27 in at least one embodiment represents a real-time clock, which may be standalone from the controller 22, and one or more low-power digital counters, which may be integrated into the controller 22. One or more counters may be used, for example, for accumulating metering pulses from the meter 100, and one or more others may be used for timing data transmissions and/or other ongoing tasks. Of course, a real-time clock, if installed, also may be used for specific, time-of-day task scheduling, such as for synchronizing data transmissions to specific reporting times.

Further, the timer 27 may track a total time the module 20 has been installed to the metered device 100. Alternatively and/or additionally, the timer 27 may maintain discrete time periods in which specific operational features of the device 20 have been in operation. Examples include but are not limited to the amount of time the controller 22 has been activated, and the amount of time that the environmental temperature is above the predetermined threshold, etc.

Indeed, in one embodiment, the controller 22 advantageously combines temperature sensing with time tracking, and uses this combined information to control dummy activations of its communication transceiver 23 for battery depassivation. That is, in one or more embodiments, the module 20 performs battery depassivation based only on tracking how long it has been operating in its low-power mode. If that time exceeds a defined threshold, it performs a dummy activation of the communication transceiver 23, to ensure that the battery 21 remains ready for an actual data transmission. However, in one or more other embodiments, the module 20 conditions its performance of battery depassivation on temperature, e.g., it may or may not perform depassivation depending on the ambient temperature. Additionally, or alternatively, it may alter how aggressively it times depassivation as a function of temperature.

In one example, in particular, the module 20 is configured to forego dummy activations if the ambient temperature is below a first defined temperature threshold, e.g., 50 degrees Fahrenheit, and to perform them if the temperature is above that threshold. In another example, the module 20 generally performs battery depassivation on a timed basis, but alters the timing of such depassivation as a function of temperature, or the number of times that depassivation is repeated in any given depassivation cycle. Doing so allows the module 20 to dynamically adapt to real-world conditions, and it can be understood that the module 20 may depassivate its battery more aggressively during hot conditions, such as summertime in New Mexico or Arizona, as compared to its depassivation behavior during operation at lower temperatures.

Figure 3:
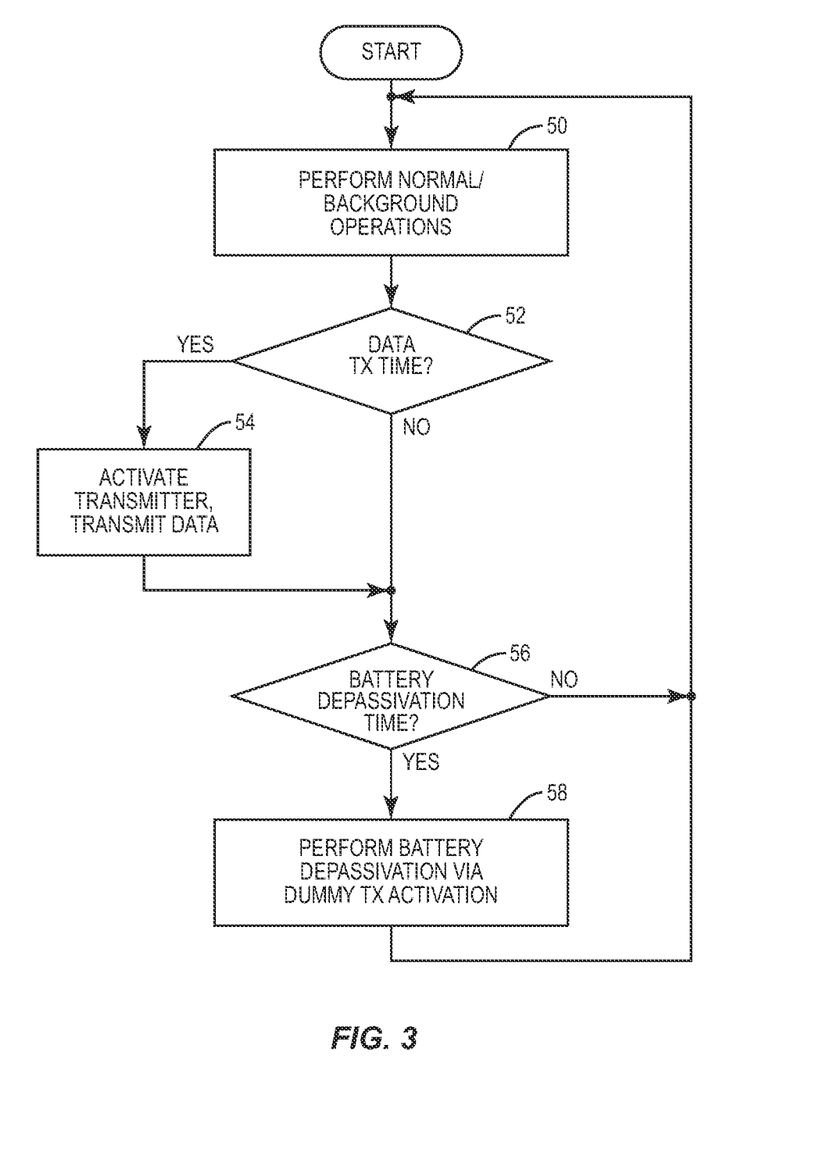
FIG. 3 is a flowchart diagram disclosing one embodiment of a method of depassivating the battery of an electronic meter-reading module or other battery-powered electronic device.

FIG. 3 broadly illustrates one embodiment of module operations and can be understood as an overall processing "loop" that runs continuously. Therefore, the illustrated processing will be understood as being presented in a simplified manner, for better emphasizing the decision processing associated with battery depassivation. In at least one embodiment, the processing method of FIG. 3 is implemented in whole or in part on a programmatic basis, according to the execution of stored computer program instructions by the controller 22. It will be appreciated that at least some of the illustrated steps may be performed in a different order, and that certain steps broken out for clarity of discussion may be subsumed in other steps or performed in parallel or in conjunction with one or more other steps.

With those points in mind, the illustrated processing begins with the module 20 performing "normal" and/or "background" operations (Block 50). The particular nature of these operations will depend on the type of module 20 at issue, the nature of the meter 100 and the type(s) of signals it provides, and other application details. In general, however, one may assume that the normal/background operations represent the task or tasks that the module 20 undertakes on an ongoing basis using comparatively low-power circuitry.

As such, during operation of the module 20 in the normal/background state of operations, the battery 21 experiences a low current draw and is, at least under certain conditions, therefore vulnerable to the buildup of a passivation layer. In one example of normal/background operations, the module 20 keeps enough circuitry active continuously or intermittently, so that it can collect metering data according to the metering signals from the meter 100 and may, from time to time, activate the receiver portion of its communication transceiver 23, to listen for transmissions targeted to the module 20.

While activation of the receiver may raise the current draw from that needed just for the controller 22, it will be understood that the transmit portion of the communication transceiver 23 represents the largest current draw of the transceiver 23 and the transmit portion typically remains turned off or otherwise inactivated until a defined transmission time. Thus, as part of performing normal/background operations 50, the module 20 determines whether it is time for a data transmission (Block 52).

For example, the module 20 may determine that it is time for a scheduled data transmission and/or that an event has occurred necessitating a transmission, e.g., the detection of an alarm condition. In any case, "YES" from Block 52 may be understood as the module 20 determining that it has reached a defined transmit time. Processing thus moves to activation of the transmitter portion of the communication transceiver 23, followed by transmission of the data to be sent, e.g., metering data, alarm conditions, etc. (Block 54). Of course, the module 20 also may activate the receiver portion of the transceiver 23, so that it can also listen for data, receive acknowledgements of its own transmissions, etc.

The transmitter activation is temporary, e.g., less than a second, or even less than a half-second. In general, the length of activation will depend on the type of transmission protocol used, the amount of data to send, but it generally is limited in time, in the interest of maximizing battery life. As such, one may understand Block 54 as being a temporary activation, after which the module 20 deactivates or otherwise turns off the transmit portion of the communication transceiver 23.

Processing "continues" with the module 20 determining whether it is time to perform battery depassivation (Block 56). In one embodiment, the module 20 maintains a timer or count value that represents the amount of time lapsed since the last data transmission. Thus, the check at Block 56 in one embodiment is a simple check of how much time has passed since the last data transmission. If the elapsed time is below a defined threshold, the module 20 determines that it is not time for battery depassivation ("NO" from Block 56) and processing returns to the normal/background operations of Block 50.

On the other hand, if the elapsed time meets or exceeds the defined threshold, the module 20 determines that it is time for battery depassivation ("YES" from Block 56), and initiates a battery depassivation routine (Block 58). After completing battery depassivation, processing returns to the normal/background processing of Block 50. Thus, in at least one embodiment, the module 20 can be understood as executing a repeating processing loop, wherein it goes about its normal/background operations while checking to see whether a defined transmit time has been reached or otherwise triggered, and also checking to see whether it should perform battery depassivation.

In one or more embodiments, the module 20 is intended for very long battery life, e.g., as much as twenty years. In this regard, the module 20 will be understood as spending most of its time in a low-power state, interrupted from time to time for data transmissions, during which the module 20 temporarily turns on or otherwise activates at least the transmitter portion of the communication transceiver 23, for transmission of metering data and/or other information. Note, too, that the module 20 also may periodically activate just the receiver portion of the communication transceiver 23, to monitor for incoming radio signaling targeted to it. This allows the module 20 to offer very low average current consumption, while still remaining reachable through the wireless communication network 30.

Thus, in one or more embodiments, the determination of whether to depassivate the battery 21 is based on time, either in the sense that module 20 keeps track of elapsed time since the last data transmission, or in the sense that the module 20 simply performs a "scheduled" battery depassivation in between data transmissions, which themselves may be "scheduled" in the sense that the module 20 is configured to perform periodically timed, regular data transmission.

However, more sophisticated decision-making is contemplated herein, as well. For example, one embodiment dynamically changes the elapsed time value used to trigger battery depassivation as a function of temperature. Battery depassivation happens more frequently at higher temperature and less frequently at lower temperature. In a variation of that method, one or more embodiments of the module 20 suspend battery passivation if the ambient temperature remains below a defined low temperature threshold.

Also, in one embodiment, the controller 22 sets a flag in memory before activating the transmit portion of the transceiver 23, and clears the flag after successful activation. In this manner, if activation of the transmitter causes a voltage droop that resets the controller 22, the flag can be read on restart to detect that event. That is, if the flag is already set when the controller 22 restarts, it interprets the restart as being caused by transmitter-induced voltage droop. Thus, in such an embodiment, the module 20 may forego depassivation operations unless and until it detects a transmitter-induced low-voltage failure.

In yet another variation, the module 20 controls how it performs battery depassivation as a function of ambient temperature. For example, in one embodiment, the module 20 may extend how long it turns on the transmitter during a dummy activation, if the ambient temperature is above a defined threshold. Additionally, or alternatively, it may turn on the transmitter initially, followed by one or more immediately successive activations of the transmitter—i.e., it may control the transmitter to draw two or more successive current "pulses" from the battery 21, during one execution of the passivation routine generally shown in Block 58.

In this regard, it will be understood that the transmitter in the communication transceiver 23 may be fixed in terms of its transmit power and may therefore have a fixed maximum current draw. In this case, the module 20 can vary the length of time that the transmitter is turned on for a dummy activation for battery depassivation, in dependence on temperature and/or in dependence on the observed battery voltage. Indeed, in at least one embodiment, battery depassivation is dynamically adapted based on the controller's corresponding observation of battery voltage.

In one such example, the controller 22 observes the battery voltage behavior in conjunction with activation of the transmitter for an actual data transmission and decides whether it should perform battery depassivation in advance of the next data transmission. Using non-limiting working numbers, the module 20 may be configured to perform a data transmission once every four hours. If the controller 22 monitors the battery voltage at each such transmission and observes no excessive droop in battery voltage when the transmitter is turned on for data transmission, it foregoes performing battery depassivation.

On the other hand, if at a given transmitter activation for data transmission the controller 22 observes excessive voltage droop, e.g., the battery voltage falls below a minimum defined voltage threshold in conjunction with performing a data transmission, then it performs a dummy activation of the transmitter for battery depassivation, sometime before the next data transmission. It may do so a defined time in advance of the next data transmission—e.g., halfway between transmissions—or immediately before the next data transmission.

This technique works even where the next data transmission is on-demand or as needed, e.g., in response to an alarm signal. In other words, the module 20 can detect an alarm condition or other triggering event, perform a dummy activation of the transmitter for depassivation, and then perform an actual data transmission. Doing so avoids the risk of experiencing failures or resets that might otherwise arise if the data transmission were performed without any preceding depassivation conditioning.

In other embodiments, the transmitter of the transceiver 23 has an adjustable transmit power. In such cases, the controller 22 may perform battery depassivation based on adjusting the duration of dummy activation and/or the transmit power setting (i.e., the magnitude of dummy activation current) of the transmitter. In one example, the controller 22 performs an initial dummy activation with the transmitter set at, say, its lowest power setting and observes battery voltage. If the battery voltage does not droop below a given threshold, the controller 22 terminates current execution of the depassivation routine. (The controller 22 may use its ADC to monitor battery voltage, or may use a comparator-based circuit—not shown—having one or more comparison thresholds.)

However, if the battery voltage exhibited too much droop in the initial dummy activation, it performs a next dummy activation, possibly at a higher power setting. This processing can be repeated until the battery voltage is well behaved and/or a repetition limit is reached, e.g., no more than four activations may be permitted in any one execution of the depassivation routine.

In one or more embodiments, the memory 25a or 25b may include a data table, indexed by temperature range. The table includes control settings that dictate how or when the controller 22 performs battery depassivation. Thus, the table can include frequency of depassivation settings, transmit power settings, etc. All such settings may be keyed to temperature ranges or thresholds, so that battery depassivation happens more aggressively at higher temperatures, and less aggressively or not at all at lower temperatures.

In any case, it will be understood that activating the transmitter (e.g., the PA) in the communication transceiver 23 uses the inherently higher current draws of the communication transceiver 23 to break down the battery's passivation layer. Thus, as shown in FIG. 2, the transceiver 23 draws a current $I_{load}$ from the battery 21 when activated. The transceiver 23 draws a much greater amount of current from the battery 21 than the controller 22, therefore $I_{load} \gg I_{control}$. Operation of the transceiver 23 therefore represents a relatively high current event for the module 20.

As will be appreciated, the function of the transceiver 23 during depassivation is different than its normal operation of transmitting gathered data through the communications network 30 and receiving signals from the communications network 30. In one embodiment, the transmitter is turned on but no data is transmitted. In one or more other embodiments, a test signal or other dummy data is transmitted during a dummy activation. Further, the transmitter may be operated at a different transmit frequency during dummy activations, or set to something other than its "standard" or assigned communication channel, to avoid the dummy activations causing unwanted interference or interruption of actual data transmissions by other modules 20 operating in the network 30.

A further point worth noting is that the terms "depassivating", "depassivation", and the like refer to the process of preventing excessive battery passivation layer buildup where the battery 21 is unable to supply the necessary voltage for the controller 22 and transceiver 23 to perform their normal operations. The actual amount that the passivation layer is removed or broken-down may vary depending upon the application, the type of battery involved, and/or the current magnitude and duration used in the dummy activations. It will be appreciated that battery depassivation herein thus does not necessarily mean that a precise amount of passivation is removed, or that all built-up passivation is removed during any given dummy activation. Rather, the processing herein is meant to prevent excessive buildup of battery passivation, and to thereby avoid operational failures of the module 20 that might otherwise arise.

Further, spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

Finally, the present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of preventing excessive battery passivation in an electronic meter reading module that is powered from a battery, the method comprising:
    collecting metering data from an associated meter on an ongoing basis using comparatively low-power circuitry that is powered from the battery;
    transmitting the metering data to a remote node through a wireless communication network at defined transmit times using a relatively high-power communication transceiver that is also powered by the battery and activated temporarily during the transmit times; and
    performing dummy activations of the communication transceiver at additional times other than the defined transmit times, not for transmitting metering data but rather for depassivating the battery.

2. The method of claim 1, wherein performing said dummy activations comprises performing one or more dummy activations in each interval of time between periodic data transmissions.

3. The method of claim 1, wherein performing said dummy activations includes deciding to perform or skip any given dummy activation in dependence on one or more of: an elapsed time since a last data transmission or dummy activation; an ambient temperature value or time-at-temperature value; or a minimum observed battery voltage as measured during a last data transmission or dummy activation.

4. The method of claim 1, further comprising conditioning the performance of said dummy activations on ambient temperature, such that said dummy activations are performed when an ambient temperature value or time-at-temperature value exceeds a predetermined threshold, and are otherwise not performed.

5. The method of claim 1, wherein performing said dummy activations includes monitoring ambient temperature and performing dummy activations more frequently at higher temperatures and less frequently or not at all at lower temperatures.

6. The method of claim 1, wherein performing said dummy activations includes triggering a dummy activation responsive to detecting that ambient temperature at the electronic meter reading module increases a predetermined amount within a predetermined period of time.

7. The method of claim 1, wherein performing said dummy activations includes triggering a dummy activation before a next data transmission in response to detecting excessive battery voltage droop in conjunction with performing a prior data transmission or a prior dummy activation.

8. The method of claim 1, wherein performing said dummy activations comprises, for each said dummy activation, executing a battery depassivation routine that includes one or more dummy activations of a power amplifier in a communication transceiver.

9. The method of claim 8, wherein said battery depassivation routine comprises an iterative routine that conditionally performs more than one activation of the power amplifier in dependence on ambient temperature or time-at-temperature, in dependence on observing battery voltage behavior in association with each such activation of the power amplifier.

10. A method of preventing excessive battery passivation in an electronic meter-reading module that is powered from a battery, the method comprising:
    operating in a low-power state for extended periods of time, and collecting or otherwise maintaining metering data from an associated meter while in the low-power state;
    interrupting the low-power state at defined transmit times, by activating a communication transceiver, including a transmitter, for performing a data transmission;
    interrupting the low-power state at additional times other than said defined transmit times, by activating the transmitter not for data transmission, but rather to reduce passivation layer buildup in the battery.

11. The method of claim 10, wherein interrupting the low-power state at said additional times comprises temporarily activating the transmitter during one or more times between said data transmissions.

12. An electronic meter reading module configured for battery-powered operation from a battery, said module comprising:
    a controller configured to obtain metering data from an interface circuit associated with a meter; and
    a communication transceiver configured to communicatively couple the module to a remote node reachable through a wireless communication network; and
    wherein said controller is configured to:
    turn on or otherwise activate the communication transceiver temporarily at defined transmit times, for transmission of said metering data or other information; and
    perform dummy activations of a transmitter in said communication transceiver at additional times other than said defined transmit times, for depassivating the battery.

13. The module of claim 12, wherein said controller is configured to perform said dummy activations by performing one or more dummy activations in each interval of time between periodic data transmissions.

14. The module of claim 12, wherein said controller is configured to decide whether to perform or skip any given dummy activation in dependence on one or more of: an elapsed time since a last data transmission or dummy activation; an ambient temperature value or time-at-temperature value; or a minimum observed battery voltage as measured by the controller for a last data transmission or dummy activation.

15. The module of claim 12, wherein said controller is configured to condition the performance of said dummy activations on ambient temperature, such that said dummy activations are performed when an ambient temperature value or time-at-temperature value exceeds a predetermined threshold, and are otherwise not performed.

16. The module of claim 12, wherein said controller is configured to perform said dummy activations based on monitoring ambient temperature and performing dummy activations more frequently at higher temperatures and less frequently or not at all at lower temperatures.

17. The module of claim 12, wherein said controller is configured to trigger a dummy activation responsive to detecting that ambient temperature at the electronic meter reading module increases a predetermined amount within a predetermined period of time.

18. The module of claim 12, wherein said controller is configured to trigger a dummy activation before a next data transmission in response to detecting excessive battery voltage droop in conjunction with performing a prior data transmission or a prior dummy activation.

19. The module of claim 12, wherein said controller is configured to perform said dummy activations based on, for each said dummy activation, executing a battery depassivation routine that includes temporarily turning on a power amplifier in the communication transceiver one or more times.

20. The module of claim 19, wherein said battery depassivation routine comprises an iterative routine wherein said controller is configured to conditionally perform more than one activation of the power amplifier in dependence ambient temperature or time-at-temperature, in dependence on observing battery voltage behavior in association with each such activations of the power amplifier.

* * * * *